UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

METHOD OF TREATING RAWHIDE AND THE PRODUCT RESULTING THEREFROM.

1,074,360. Specification of Letters Patent. Patented Sept. 30, 1913.

No Drawing. Application filed February 1, 1912. Serial No. 674,681.

*To all whom it may concern:*

Be it known that I, ALBERT H. HENDERSON, a citizen of the United States, residing at Baltimore, State of Maryland, have invented new and useful Improvements in Methods of Treating Rawhide and the Product Resulting Therefrom, of which the following is a specification.

My invention relates, first, to treating rawhide in a manner producing novel conditions in its body or substance; secondly, to a product resulting from such treatment and having great strength and tenacity as well as elastic properties and adaptability, by its possession of vulcanizing ingredients, for union or amalgamation with rubber or its recognized substitutes; and, finally, to a composition of matter including a rawhide body the permanently enlarged pores of which are charged with oil beyond the extent found in the rawhide in its normal condition and possessed of vulcanizing substances, combined or impregnated with rubber or a recognized rubber substitute, the latter being vulcanized.

Referring first to the method of treatment, the rawhide as the basic element is first taken in its natural state in which when dried it has great density and hardness, its induration being then almost equal to that of rock or steel. The rawhide in such normal state is first placed in a suitable moistening device of the humidor class for a length of time sufficient to render it somewhat flexible and elastic, after which it is cut into slugs or strips, or brought to fragmentary, granulated or shredded condition. This having been done, the hide in such comminuted form is transferred to a vessel containing a solution of water and salt, the latter being in the proportion of five per cent. or thereabout. This vessel is surrounded by or combined with steam or hot water pipes, and by them or otherwise subjected to a slow gentle heat, or the vessel may be placed in a second vessel of water exposed to such temperate heat until the hide has considerably and permanently expanded or been brought to a porous or spongy condition. After this, the rawhide, having been measurably dried by suitable means, is placed in a revolving perforated cylinder and slowly heated in the presence of vegetable or animal oils, remaining immersed therein and in a state of rotation until it has become soft and plastic. The oils may be of any kind comprised under these generic terms. The choice must depend upon certain conditions, as the rigidity and density of the rawhide which varies in the animal kingdom.

While I wish it to be understood that vegetable or animal oils, broadly, or their derivatives, are applicable to my purpose, such a constituent as glycerin preferably mixed with salt and water, and Turkey red and creosoted oils or their derivatives, may be named as having been found especially so. This operation is continued for from five to nine hours, during which all the natural fluidity or moisture found in the hide, as water or otherwise, having greater volatility than oil, is dissipated, while the pores of the hide absorb a great percentage of the oils in which the cylinder revolves. The treated rawhide, having its pores charged with oil, and its particles in a measure reunited, is now subjected to cutters or agitators, and thereby reduced to small grains and shreds, which are thereafter thoroughly mixed and kneaded by suitable machinery, the blend amalgamating, coalescing or uniting as one substance. This is now run through heated rolls in the presence of an admixture of sulfur and other vulcanizing agents. The mass is then rolled out by calenders or hot presses by which it is shaped to the demands of general use in manufacture, and especially for union with rubber. The product which is the result of such treatment is possessed of great toughness, durability and elasticity, and forms in itself an article of commerce adapted to a great variety of uses. Its possession of vulcanizing ingredients fits it for union or amalgamation with rubber or rubber substitutes which are in themselves found in the market; and a body resulting from the uniting of the rawhide, treated in the manner described, with rubber or a rubber substitute, is believed to be a novel composition of matter, and is here claimed as such.

Among the rubber substitutes is an important and growing class of compounds, artificial in character, while others are natural products. Furthermore, with the rubber, however used, any of these substitutes or reclaimed rubbers, in smaller or larger quantities, may be employed. By the term reclaimed rubbers is meant real rubber once vulcanized, and from which sulfur and other substances have been removed, the residue having been worked up into a condition where it may be again used. The permanently enlarged pores of the rawhide being charged with oil, there is given to the rawhide a greater flexibility than is found therein in its normal and undried condition, its flexibility conforming in character to that of the rubber with which it is combined. The unified mass therefore possesses that toughness, tenacity, flexibility and elasticity which give to it an extended field of usefulness in the arts. The vulcanizing ingredients not only fit the treated rawhide for union or amalgamation with rubber, but seal its opened pores and consequently prevent the escape or dissipation of the oil with which the rawhide is virtually impregnated. Therefore the new principle or character of resiliency and elasticity imparted to the body remains without change or deterioration.

Having thus described my invention, I claim:—

1. The herein described method which consists in rendering natural rawhide flexible and elastic under the influence of moist heat; dividing the substance thus treated into particles; subjecting them to a heated solution of salt and water the former in the proportion of about five per cent.; partially drying the particles; agitating them under the influence of heat and in the presence of oil whereby they are brought to a state of plasticity and comparative coalescence and all fluidity or moisture, having greater volatility than the oil, is dissipated thus allowing the substance to absorb the latter; again reducing the particles and mixing and kneading the same; subjecting the mixed and kneaded mass to heat and pressure in the presence of vulcanizing agents, and finally forming into sheets.

2. The herein described substance or composition of matter consisting of particles of rawhide rendered flexible and elastic, charged with oil, unified, and combined with vulcanizing agents.

3. The herein described substance or composition of matter consisting of particles of rawhide rendered flexible and elastic, charged with oil, unified, coated and sealed with vulcanizing agents, and combined with rubber.

In testimony whereof I affix my signature in presence of two witnesses.

ALBERT H. HENDERSON.

Witnesses:
C. B. BULL,
CHARLES LOWELL HOWARD.